Patented Dec. 14, 1926.

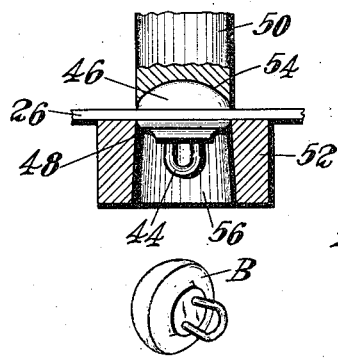
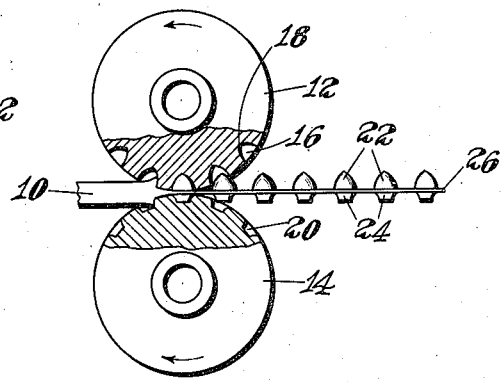
Fig. 6   Fig. 1
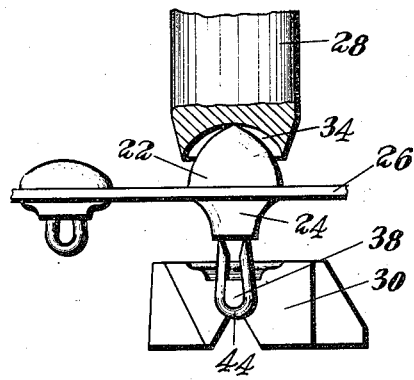
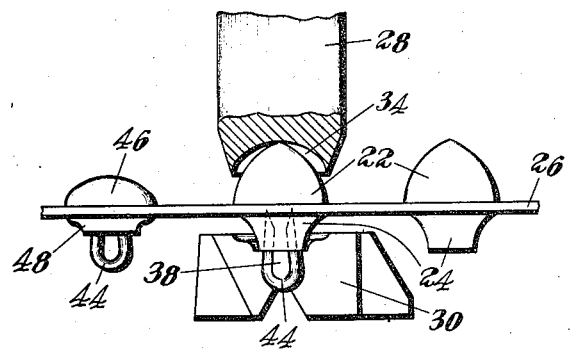
Fig. 2   Fig. 3
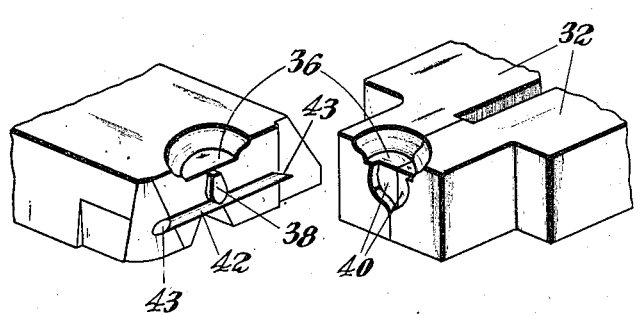
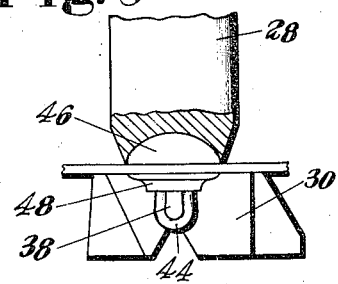
Fig. 5   Fig. 4

1,610,295

UNITED STATES PATENT OFFICE.

ALBERT LATHAM, OF BEVERLY, MASSACHUSETTS, ASSIGNOR TO AMERICAN BUTTON & FASTENER CO., OF AUGUSTA, MAINE, A CORPORATION OF MAINE.

METHOD OF MOLDING ARTICLES.

Application filed March 21, 1919. Serial No. 283,984.

This invention relates to methods of molding articles, as in plastic material, by which, in the present connection, is meant material capable of assuming a form imparted to it under pressure. More particularly, the invention is concerned with the making of buttons. As these are ordinarily manufactured for shoes and the like, a cylindrical blank is first cut by means of a die from papier-mâché, the blank being then pressed between opposite mold-sections to give the desired form. This method of procedure is objectionable in several ways. The blank has flat ends, which contact at their peripheries over very small areas with the curved walls of the mold-sections, there being, between these ends and the mold-walls, spaces into which the material of the blank is forced to produce the button-form when the sections are brought together. The air pocketed in these spaces resists the effecting of perfect contact of the material with the mold-walls, and an irregular shape may result. With the heavy pressure which must be applied to bring the material to form in a single operation upon the blank, there may be stresses acting within the compressed material which cause its gradual expansion after molding and consequent deformation. When the plastic material is in laminæ, as is the case with papier-mâché, this distortion is particularly liable to show itself at the co-operating edges of the mold sections, where ragged lines appear in the button. Moreover, the repeated rubbing of the blank edges over the mold surfaces as they are compressed tends to quickly wear away the metal so that the usefulness of the molds is destroyed. This effect is increased by the abrasive particles which are usually present in the material.

An object of the invention is to provide a novel method of molding an article accurately and in permanent form with minimum wear of the molds. This is accomplished by successive molding operations, the form first produced or that resulting from an initial operation, being elongated and contacting with the mold later operating upon it over a limited central area, this latter mold flattening and expanding it outwardly. Simultaneously with the secondary forming operation, an appendage of the article, as the eye of a button, may be forced into the material.

Another object of the invention is to maintain, after an operation upon them, the articles being produced in a favorable relation for succeeding operations. This I effect by molding material to furnish a reduced strip with articles partially formed thereon to a preliminary shape, then further molding the articles to impart a finished shape while they are carried by the strip and thus definitely located in their relation to one another, and thereafter separating the formed articles from the strip. The connection takes the form of a web carrying the partially shaped articles.

The accompanying drawing illustrates the steps of my improved method carried out by devices convenient for their accomplishment, Fig. 1 showing, in side elevation with parts in section, the initial forming operation as applied to a button;

Figs. 2, 3 and 4 showing similarly successive stages of the following forming and the eye-inserting operation;

Fig. 5, a perspective view of the lower mold-sections employed in this forming and inserting operation; and Fig. 6, a sectional elevation of the step of separating the button from the carrier web.

Assuming, for the purpose of describing a particular application of the invention, that shoe buttons are being produced, a suitable plastic material, as papier-mâché, is delivered in a ribbon 10 (Fig. 1) between upper and lower rolls 12 and 14, respectively, to which power is applied to rotate them oppositely in the directions indicated by the arrows. The upper roll is provided with a circumferential series of depressions 16, furnishing identical mold-sections regularly spaced about the periphery of the roll. The form of these depressions is similar to the head of a shoe button, but elongated and with the walls converging at 18 to a point lying in the longitudinal axis of the button. The roll 14 has a like series of mold-depressions 20, the opposite depressions 16 and 20 successively registering in the rotation of the rolls. The depressions 20 resemble the neck of a button, or that portion adjacent to the eye, but are of less diameter and elongated in the direction of the axis. The rolls 12 and 14 are spaced from one another, and, as the plastic ribbon 10 is fed between them, there is produced, by the action of the depressions upon the ribbon, a regular, spaced series of partially formed buttons having head portions 22 and neck portions 24 connected by a web 26 between the head and neck portions, this web being of a thickness determined by the spacing between the roll peripheries. The buttons carried by the web resemble the finished button, except both the head and neck portions are longer and are of less diameter, and the head is pointed, instead of being rounded.

To further form the buttons, the web, now partly set to a somewhat less plastic condition, is passed by any convenient feeding device, which advances it intermittently in regular steps, between an upper section 28 and lower sections 30, 32, 32, of what is shown as a combined mold and die having reciprocatory parts. The mold-section 28 has a depression 34 in the shape of the finished button-head. There is situated between the sections 30, 32, 32, a depression 36, corresponding to the neck of the finished button. Below the depression 36, the section 30 carries a bending projection 38, having an external contour similar to the interior of the button-eye. The sections 32, 32 are provided with halves of a depression 40 co-operating with the projection. The upper and lower sections are movable vertically toward and from one another, and the lower sections 30 and 32, 32 also have a relative vertical movement, the depression 40 rising beneath the projection 38, while the sections 32, 32 at the same time open and close, or oscillate with relation to one another. These various movements may be caused in any convenient manner. The sections 30, 32, 32 being separated, wire 42 is fed beneath the projection 38 and cut off by means (not shown) giving reduced entering portions 43. The co-operation of the depression 40 with the projection 38, due to the lifting and closing of the sections 32, 32, bends the cut wire about the projection to the form shown in Fig. 2 of the drawings. The web 26 in its feed now advances the opposite button-portions between the molds 28, 30, 32, stopping when a button is alined with the depressions 34, 36. These first move toward one another sufficiently to force the eye 44 and button together, as appears in Fig. 3, then their further travel, both ends of the button being in contact with the walls of the mold-depressions, gradually expands the head and neck outwardly from the central areas until they fill the depressions, bringing the button to the form shown in Fig. 4.

At this stage, the buttons still remain joined by the web, having assumed their final shape, except that the web divides them between the head and neck. They are now fed between reciprocatory upper and lower punch-sections 50 and 52, respectively. The section 50 has, at its lower end, a depression 54 shaped similarly to the button-head, and the lower section is provided with an alined opening 56, of such diameter as to receive the section 50. As in the preceding operation, the web and buttons advance in regular steps, timed in accordance with the reciprocation of the punch-sections, stopping when a button is in alinement with the opening 56. The sections advancing cut the button from the web, it falling through the opening 56 in its finished form, as indicated at B. If the plastic material is in laminæ, the direction of these it at no step in the operation abruptly changed, but they are gradually brought to their final form, without setting up injurious stresses. The button thus produced is regular in contour, presents a smooth surface, has a well-defined neck portion, is not subject to distortion by expansion, and the wear upon the molds is well distributed so they require only infrequent renewal.

Having described my invention, what I claim as new and desire to secure by Letters Patent of the United States is:

1. The method of producing articles from laminated plastic material, which consists in operating upon the material to produce a form longer than the completed article, such dimension being transverse to the laminæ, and then operating upon the material thus formed to flatten it, the expansion taking place in the direction of extension of the laminæ.

2. The method of producing articles from plastic material, which consists in subjecting the material to pressure to produce a form resembling but differing from the completed article, thereafter operating upon the plastic material to further form the article, and simultaneously forcing an appendage into the substance of the formed material.

3. The method of producing articles from plastic material, which consists in subjecting the material to pressure to produce a form resembling but differing from the completed article, and then applying additional pressure to bring the plastic material more closely to the desired form and to force an appendage into the formed article.

4. The method of making buttons, which consists in rolling plastic material between rotatable molds to initially form a button and a surrounding web differing in character from the material operated on, and thereafter subjecting the partially formed button to the action of reciprocatory molds.

5. The method of making buttons, which consists in subjecting papier-mâché to pressure to produce a button-form elongated axially, and thereafter flattening said button.

6. The method of making buttons, which consists in subjecting papier-mâché to pressure to produce a button-form more pointed than the completed button, and thereafter rounding said button.

7. The method of making buttons, which consists in pressing material between molds giving a button-form having a pointed head and elongated neck, and then molding the button-form thus produced to give a rounded head and flattened neck.

8. The method of making buttons, which consists in subjecting plastic material to pressure to produce a button-form different from the completed button, and thereafter operating upon the partially shaped button to change its form and force an eye into the formed material.

9. The method of making buttons, which consists in rolling plastic material between rotatable molds to initially form a button and a surrounding web, said web being thinner than the material supplied to the molds and thereafter subjecting the partially formed button to the action of reciprocatory molds which change its form and insert an eye therein.

10. The method of making buttons, which consists in subjecting plastic material to pressure to produce a button-form elongated axially with a reduced portion at one extremity, thereafter flattening the button by a force applied in the direction of the axis whereby pressure is exerted upon the material from the reduced portion outwardly, and inserting an eye in said button.

11. The method of producing articles from plastic material, which consists in molding a plurality of the articles to impart a preliminary shape thereto and at the same time reducing the thickness of the material between said articles to form a connecting-web, subjecting the articles to a further operation upon the formed web to impart a finished shape to said articles, and thereafter separating the articles from the web.

12. The method of producing articles from plastic material, which consists in forming a plurality of the articles with a connecting web, and inserting an appendage in each article while in place upon the web.

13. The method of producing articles from plastic material, which consists in forming a plurality of the articles with a connecting web, and inserting an appendage in each article and further forming it while in place upon the web.

14. The method of making buttons from plastic material, which consists in forming the buttons with head and neck portions at opposite sides of a web of the material, and separating the buttons from the web.

15. The method of making buttons from plastic material, which consists in forming the buttons with head and neck portions upon opposite sides of a web of the material, further forming the buttons while in place upon the web, and separating the formed buttons from the web.

16. The method of making buttons from plastic material, which consists in forming the buttons with head and neck portions upon opposite sides of a web of the material, further forming the buttons and inserting an eye therein while in place upon the web, and separating the formed buttons from the web.

In testimony whereof I have signed my name to this specification.

ALBERT LATHAM.